US008935283B2

(12) United States Patent
Oka et al.

(10) Patent No.: US 8,935,283 B2
(45) Date of Patent: Jan. 13, 2015

(54) SYSTEMS AND METHODS FOR SEARCHING FOR ANALOG NOTATIONS AND ANNOTATIONS

(75) Inventors: Anand Ravindra Oka, Waterloo (CA); Sean Bartholomew Simmons, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/634,473

(22) PCT Filed: Apr. 11, 2012

(86) PCT No.: PCT/CA2012/050233
§ 371 (c)(1),
(2), (4) Date: Sep. 12, 2012

(87) PCT Pub. No.: WO2013/152417
PCT Pub. Date: Oct. 17, 2013

(65) Prior Publication Data
US 2013/0275459 A1    Oct. 17, 2013

(51) Int. Cl.
*G06F 17/30* (2006.01)
(52) U.S. Cl.
CPC .... *G06F 17/30424* (2013.01); *G06F 17/30967* (2013.01); *G06F 17/30979* (2013.01)
USPC .......................................... 707/772; 715/268
(58) Field of Classification Search
USPC .......................................... 707/772; 715/268
See application file for complete search history.

(56) References Cited

U.S. PATENT DOCUMENTS

| 5,022,086 | A | * | 6/1991 | Crane et al. ................... 382/121 |
| 5,095,510 | A | * | 3/1992 | Webster ....................... 382/121 |
| 5,479,531 | A | * | 12/1995 | Webster ....................... 382/119 |
| 5,832,474 | A | | 11/1998 | Lopresti et al. |
| 6,694,056 | B1 | * | 2/2004 | Ito et al. ........................ 382/186 |
| 7,577,901 | B1 | | 8/2009 | Hull et al. |
| 7,873,217 | B2 | | 1/2011 | Koubaroulis et al. |
| 7,962,846 | B2 | | 6/2011 | Lerner et al. |

(Continued)

OTHER PUBLICATIONS

Srihari, et al., Search engine for handwritten documents. In Electronic Imaging 2005 (pp. 66-75).*

(Continued)

*Primary Examiner* — William Spieler
(74) *Attorney, Agent, or Firm* — Blake, Cassels & Graydon LLP; Wilfred P. So; Brett J. Slaney

(57) ABSTRACT

Systems and methods are provided for searching for analog data, including hand writing, facial expressions and voice data. With respect to analog writing, a device records and stores analog writing, including time, pressure and position as a writing tool moves on a touch screen device. A search term that includes time, pressure and position data, is received. The search term is compared with the time, pressure and position stored on the device. If they are similar, then the stored analog writing is displayed. In other example embodiments, facial expressions and voice data can be used as search terms to respectively search for stored facial expressions and voice data.

18 Claims, 12 Drawing Sheets

(56) References Cited

U.S. PATENT DOCUMENTS

| | | |
|---|---|---|
| 2002/0099552 A1 | 7/2002 | Rubin et al. |
| 2005/0154707 A1 | 7/2005 | Napper et al. |
| 2005/0222848 A1 | 10/2005 | Napper et al. |
| 2007/0274590 A1 | 11/2007 | Arai |
| 2008/0181508 A1* | 7/2008 | Kaneda et al. ............... 382/190 |
| 2009/0119288 A1 | 5/2009 | Sagoo et al. |
| 2011/0038543 A1 | 2/2011 | Bhattacharyya et al. |
| 2011/0275355 A1 | 11/2011 | Longe et al. |
| 2012/0023135 A1 | 1/2012 | Dahlkvist et al. |

OTHER PUBLICATIONS

El Hamad, Adel; International Search Report from corresponding PCT Application No. PCT/CA2012/050233; search completed on Jan. 7, 2013.

* cited by examiner

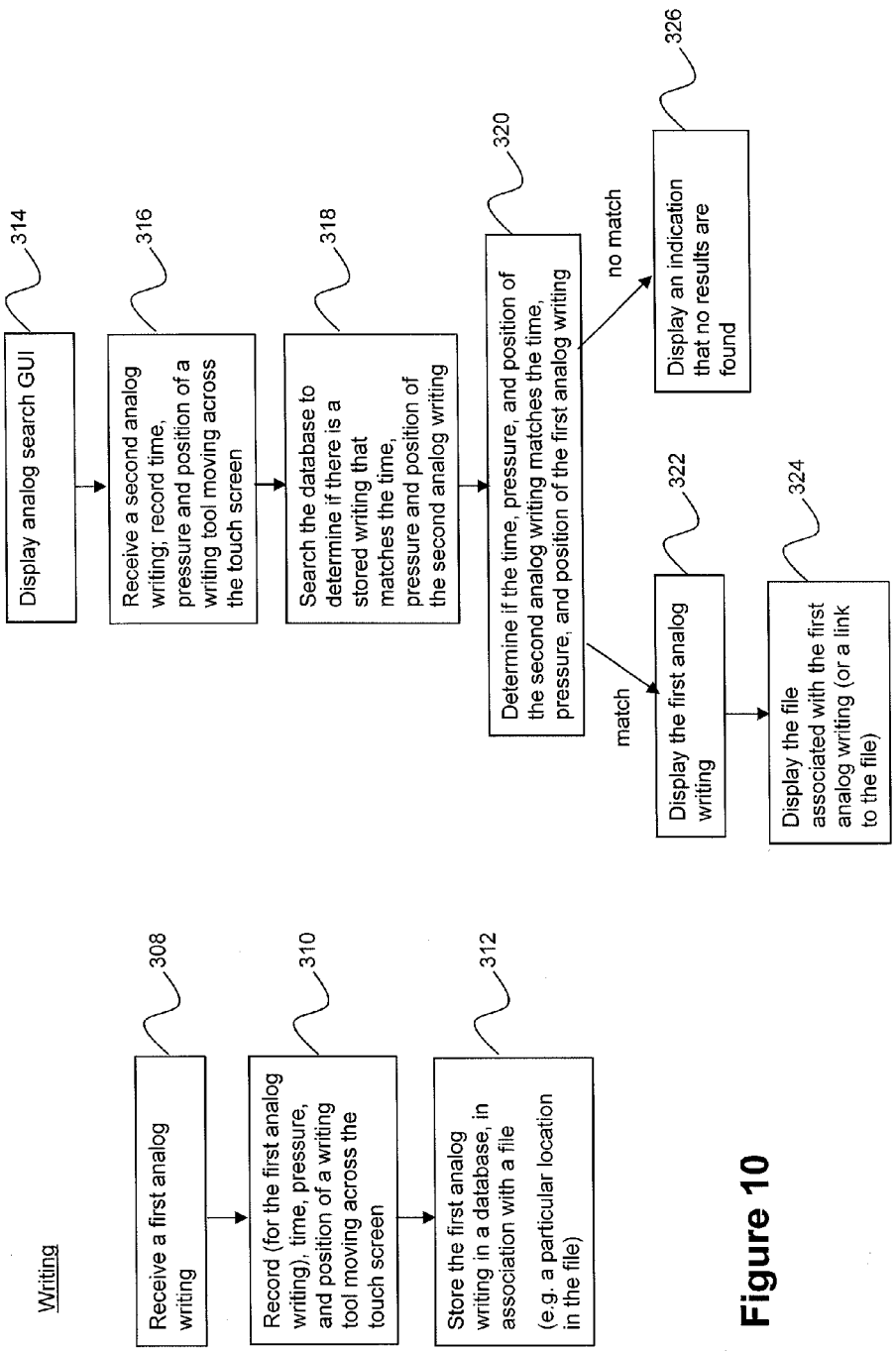

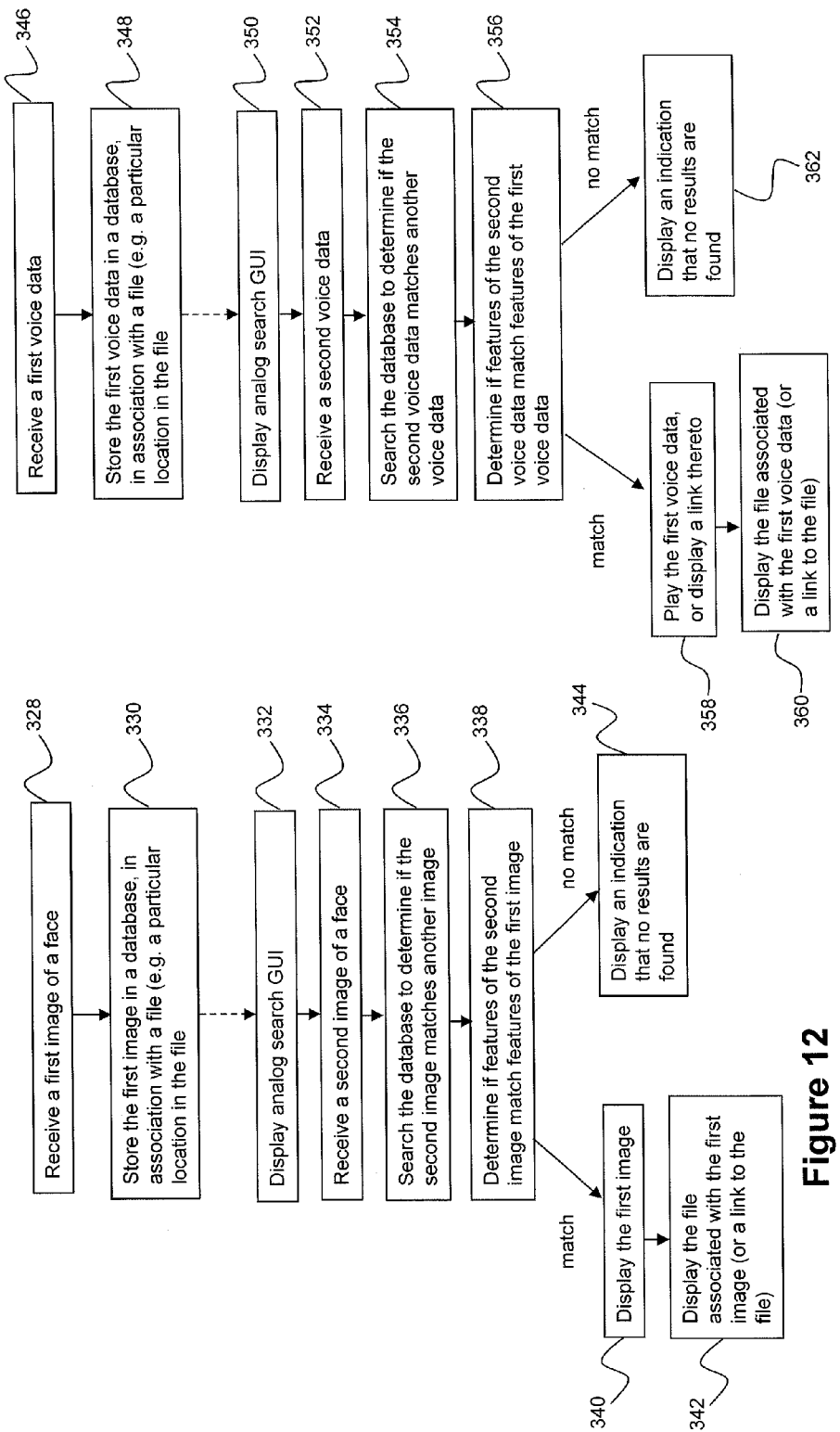

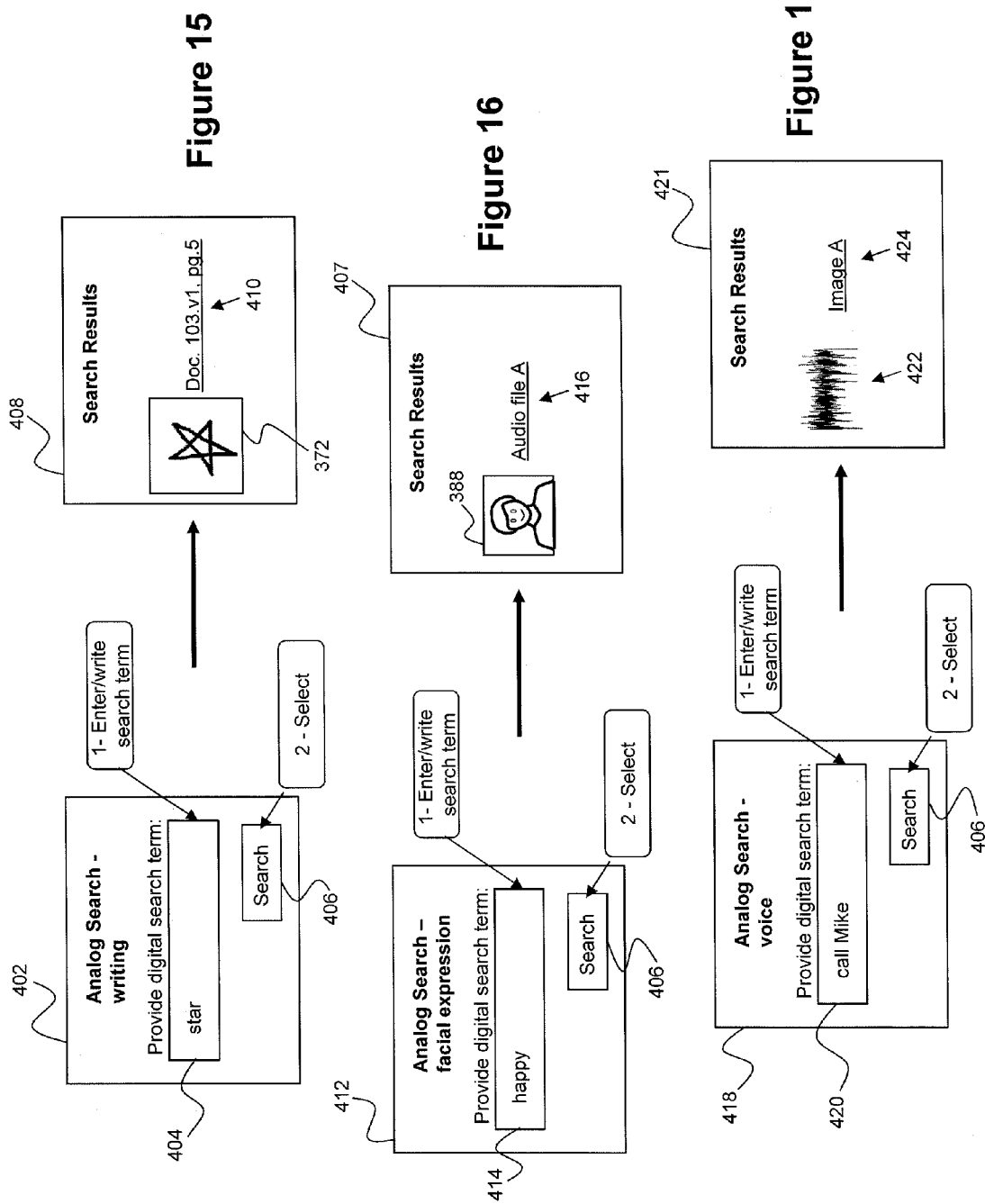

SYSTEMS AND METHODS FOR SEARCHING FOR ANALOG NOTATIONS AND ANNOTATIONS

TECHNICAL FIELD

The following relates generally to searching for analog notations and annotations.

DESCRIPTION OF THE RELATED ART

Users interact with traditional media, such as paper magazines and paper articles, by writing notes along the margins. In some computer applications, a user may also annotate a digital document. For example, a user may type in text to provide their comments or thoughts with respect to a certain sentence within the document. In some computer applications, a user can make a notation using a stylus and computing device's touch screen.

BRIEF DESCRIPTION OF THE DRAWINGS

Example embodiments will now be described by way of example only with reference to the appended drawings wherein:

FIG. 10 is a flow diagram of an example embodiment of computer executable or processor implemented instructions for storing analog writing.

FIG. 11 is a flow diagram of an example embodiment of computer executable or processor implemented instructions for searching for analog writing.

FIG. 12 is a flow diagram of an example embodiment of computer executable or processor implemented instructions for storing facial expressions, and searching for the same.

FIG. 13 is a flow diagram of an example embodiment of computer executable or processor implemented instructions for storing voice data, and searching for the same.

FIG. 15 is an illustration of example embodiment screen shots, including an analog search GUI for receiving a digital search term and a search results GUI showing analog writing.

FIG. 16 is an illustration of example embodiment screen shots, including an analog search GUI for receiving a digital search term and a search results GUI showing a facial expression.

FIG. 17 is an illustration of example embodiment screen shots, including an analog search GUI for receiving a digital search term and a search results GUI providing voice data.

DETAILED DESCRIPTION

Figure 2:
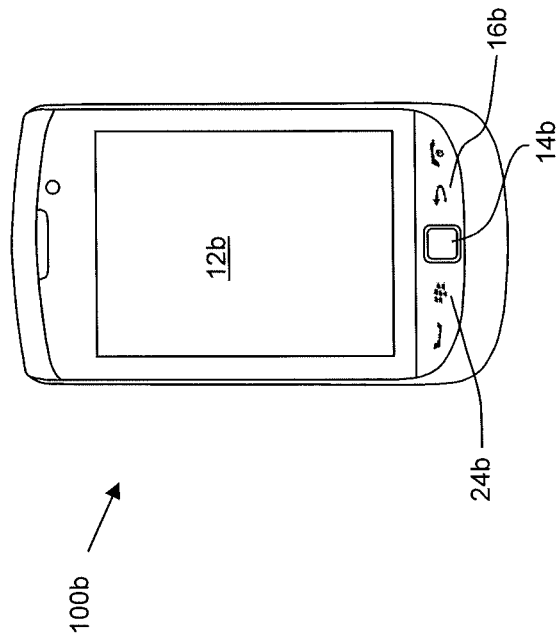
FIG. 2 is a plan view of another example embodiment mobile device.

It will be appreciated that for simplicity and clarity of illustration, where considered appropriate, reference numerals may be repeated among the example figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Over the last several years, many users have stopped using printed media like books, newspapers and journals, and many users have adopted digital media (e.g. blogs, PDFs, text documents, digital images, etc.).

In this transition, many users annotate such digital media using digital notations. For example, a user can type a comment and tag it to a picture or to a document.

Analog notation, such as quickly scribbled margin notes, doodles, arrows connecting parts of the content, and other kinds of pictograms laden with private meaning unique to the reader are not used often with digital media. However, such analog notations are often preferred by users like students, scientists and authors.

Analog notation can also be useful on its own, without the context of annotating another document. For example, a quickly scribbled list of groceries, or diagrams and handwritten notes on a shared white board by a group of researchers, are examples of analog content notation. In some example embodiments, the concept of analog annotation or notation includes voice notes made by users, such as professionals like doctors or lawyers reminding themselves about action items.

It can be appreciated, that in general, making and reading analog notations and annotations are very intuitive acts.

Part of the reason why analog notation and annotation have not become popular with digital media is the difficulty or inability to search for analog notations and annotations, in a similar manner to the way users do keyword searches using digital text.

A known approach to making such analog search possible would be to convert the analog notation, like a handwritten note, into digital text via optical character recognition. Similarly, analog voice data is converted to digital text using speech-to-text technology. The digital text is then stored and used, instead of the analog writing or the analog voice data.

It is recognized, however, that much of the data in original analog writing or voice data is lost when converting the analog data to digital text. For example, the writing style, the thickness of lines, and certain shapes cannot be captured and represented by digital text. Similarly, the frequency of the voice, the speed at which a user speaks words, certain accents of words, and the volume of that words are spoken, are examples of analog voice data that are lost when converting speech to digital text.

Also many kinds of graphical annotations like pictograms and symbols are difficult or impossible to digitize. An example reason is that the possible digitized variants require large amounts of memory space.

The methods and systems described herein provide ways to search for analog data using analog search terms. In other words, the information provided with analog data is maintained.

In an example embodiment of analog writing, or handwriting, a first time series of position and a first time series of pressure are recorded and stored using a computing device. This information can be detected, for example, as a stylus moves across a touch screen device. When a user wishes to search for the analog writing, the user uses the stylus to enter the same writing. In other words, a second time series of pressure and a second time series of position are recorded at the search term. The computing device then determines if the second time series of position and the second time series of pressure match the first time series of position and the first time series of pressure. If so, the stored handwriting is displayed as the search result.

An example reason for doing such an analog search is that information is not lost in the analog-to-digital translation, and hence a better "findability" is achieved. In particular, items that cannot be deciphered or digitized properly (e.g. a doctor's scribbled prescription) can nevertheless be located and recovered easily by the methods of analog search described herein. Since most analog notations and annotations suffer from this decipherability problem, the ability to do analog search becomes a very important tool. For example, a scribbled note may be unreadable to a third person, but will nevertheless often be easily understandable to the person who made the note.

It can be appreciated that various electronic and computing devices can be used with the example embodiments described herein. Examples of such devices include pagers, tablets, cellular phones, cellular smart-phones, wireless organizers, personal digital assistants, mobile computers, laptops, handheld wireless communication devices, wirelessly enabled notebook computers, camera devices and the like. Such generally mobile devices will hereinafter be commonly referred to as "mobile devices". It will however be appreciated that the example embodiments described herein are also suitable for other electronic and computing devices that are generally not mobile, e.g. desktop computers and other "non-mobile" electronic and computing devices. The terms mobile devices, electronic devices and computing devices are herein used interchangeably.

In an example embodiment, the mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 1:
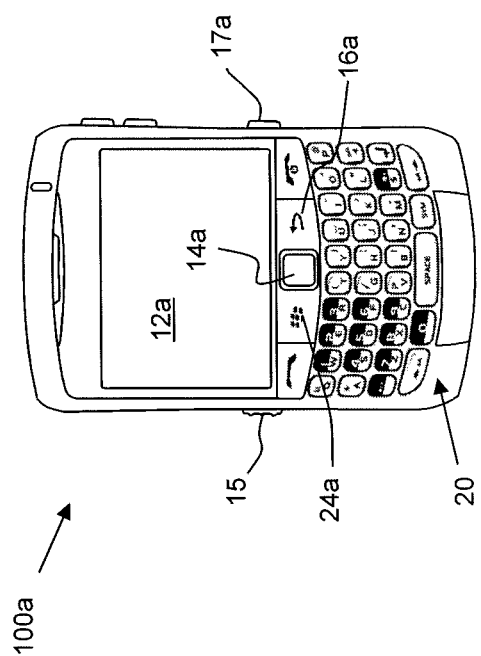
FIG. 1 is a plan view of an example embodiment mobile device.

Referring to FIGS. 1 and 2, an example embodiment of a mobile device 100a is shown in FIG. 1, and another example embodiment of a mobile device 100b is shown in FIG. 2. It will be appreciated that the numeral "100" will hereinafter refer to any mobile device 100, including the example embodiments 100a and 100b, those example embodiments enumerated above or otherwise. It will also be appreciated that a similar numbering convention may be used for other general features common between all Figures such as a display 12, a positioning device 14, a cancel or escape button 16, a camera button 17, and a menu or option button 24.

The mobile device 100a shown in FIG. 1 comprises a display 12a and a cursor or view positioning device 14. In an example embodiment, the display 12a is touch-sensitive. Shown in this example embodiment is an optical track pad 14a. In another example embodiment, the positioning device 14 is a track ball (not shown). Positioning device 14 may serve as another input member and detects the displacement of a finger that is moving on top of it to provide selection inputs to the main processor 102 (see FIG. 4). It can also be pressed in a direction generally toward housing to provide another selection input to the processor 102. The optical track pad 14a permits multi-directional positioning of the selection cursor 18 (see FIG. 6) such that the selection cursor 18 can be moved in an upward direction, in a downward direction and, if desired and/or permitted, in any diagonal direction. The optical track pad 14a is in this example situated on the front face of a housing for mobile device 100a as shown in FIG. 1 to enable a user to manoeuvre the optical track pad 14a while holding the mobile device 100a in one hand. The optical track pad 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 1 also comprises a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this example embodiment, a standard QWERTY keyboard.

Although not shown in the drawings, it can be appreciated that the devices shown in FIGS. 1 and 2 can have front facing cameras, such that when the user is looking at the display, the user's image is captured by the front-facing camera.

The mobile device 100b shown in FIG. 2 comprises a touch sensitive display 12b and the positioning device 14b in this example embodiment is an optical track pad 14b. In another example embodiment, the positioning device 14b is a track ball (not shown). The mobile device 100b also comprises a menu or option button 24b, and a cancel or escape button 16b. In an example embodiment, the mobile device 100b includes a "slide-out" QWERTY keyboard (not shown). In this example embodiment, the keyboard (not shown), positioning device 14b, escape button 16b and menu button 24b are disposed on a front face of a mobile device housing. The keyboard (not shown) slides out from a side of the mobile device 100b to reveal a standard QWERTY keyboard. In another example embodiment, the mobile device 100b does not include a physical keyboard, but can display a virtual keyboard on the display 12b.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 1 and 2 are for illustrative purposes only and various other mobile devices 100 are equally applicable to the following examples. For example, other mobile devices 100 may include the trackball 14b, escape button 16b and menu or option button 24 similar to that shown in FIG. 2 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities.

Figure 3:
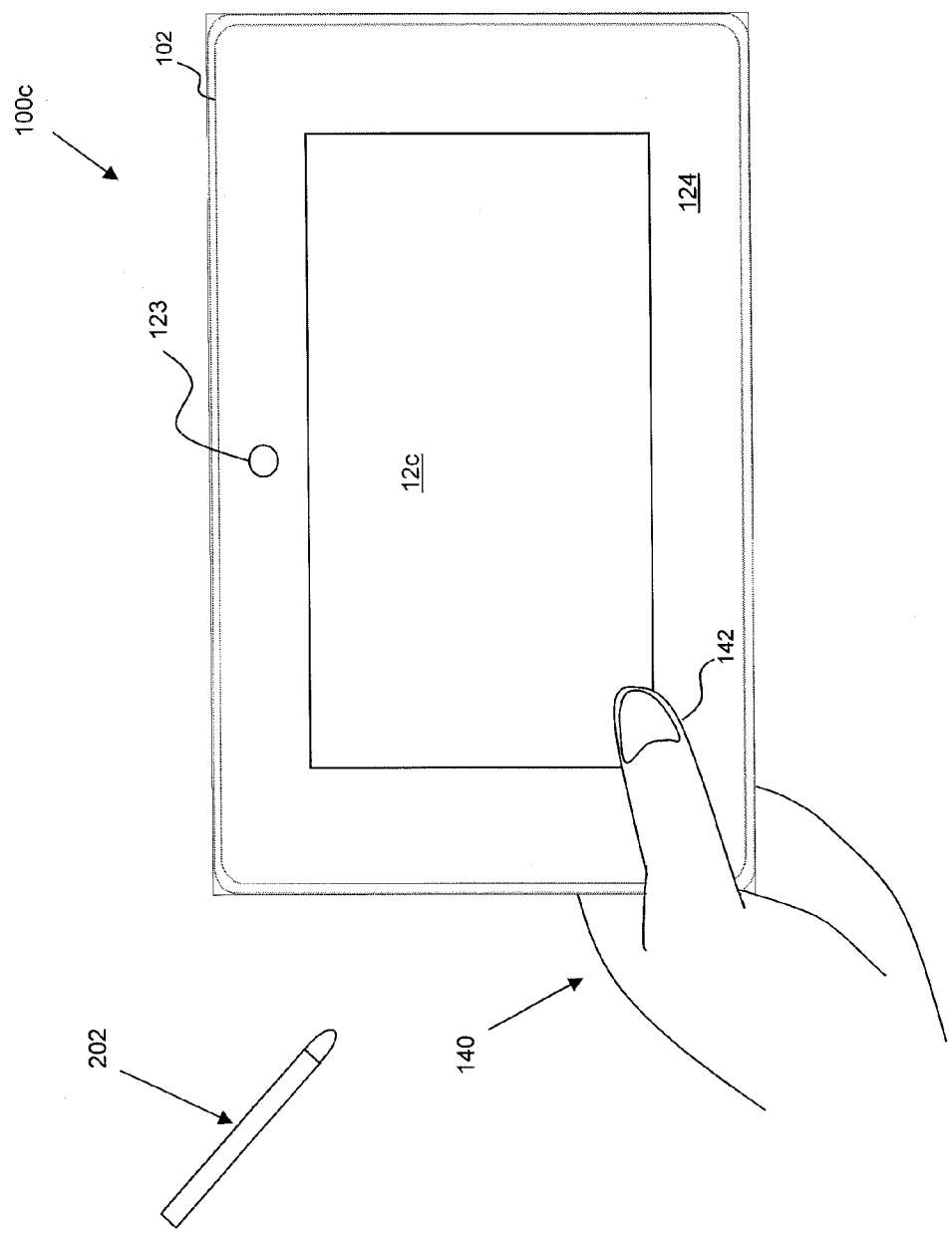
FIG. 3 is a plan view of another example embodiment mobile device.

The mobile device 100c shown in FIG. 3 includes a touch-sensitive display 102 and a front-facing camera 123. The touch-sensitive display 102 includes a touch-sensitive non-display area 124 surrounding a touch-sensitive display area 12c, both of which may be capable of receiving inputs in the form of touching. The front-facing camera 123 looks towards the user to capture images or videos of the user or scenes behind the user. Although not shown in FIG. 3, it can be appreciated that the mobile device 100c can include at least one physical button, knob, slider, or any other form of switch for receiving an input from a user. It can also be appreciated that the mobile device 100c includes other software components to enable a virtual keyboard application.

A writing tool can be used to create symbols, pictures, letters, etc. on the touch sensitive displays 12a, 12b, 12c. A writing tool may be a user's finger moving along the touch sensitive display. In another example embodiment, a writing tool is a stylus 202 (see FIG. 3). The stylus 202 may be active or passive.

To aid the reader in understanding the structure of the mobile device 100, reference will now be made to FIG. 4.

Figure 4:
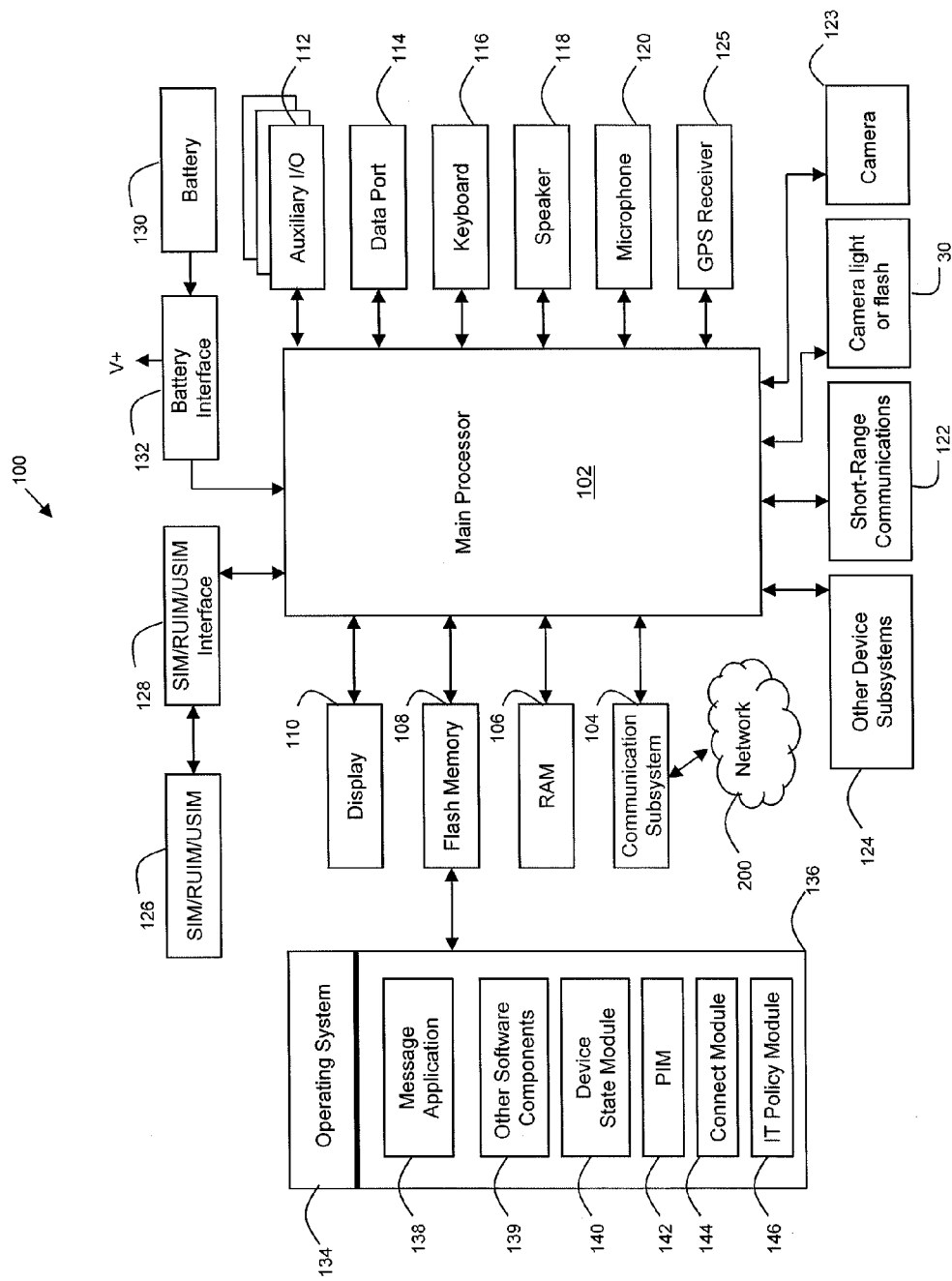
FIG. 4 is a block diagram of an example embodiment of a mobile device.

Referring to FIG. 4, shown therein is a block diagram of an example embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 125, short-range communications 122, a camera 123, a camera light or flash 30, and other device subsystems 124. The display 110 may be a touch-sensitive display as is the case in the example embodiment shown in FIG. 3.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the mobile device 100 to communicate with the wireless infrastructure and any host system, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, picker applications, virtual keyboards, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

Figure 5:
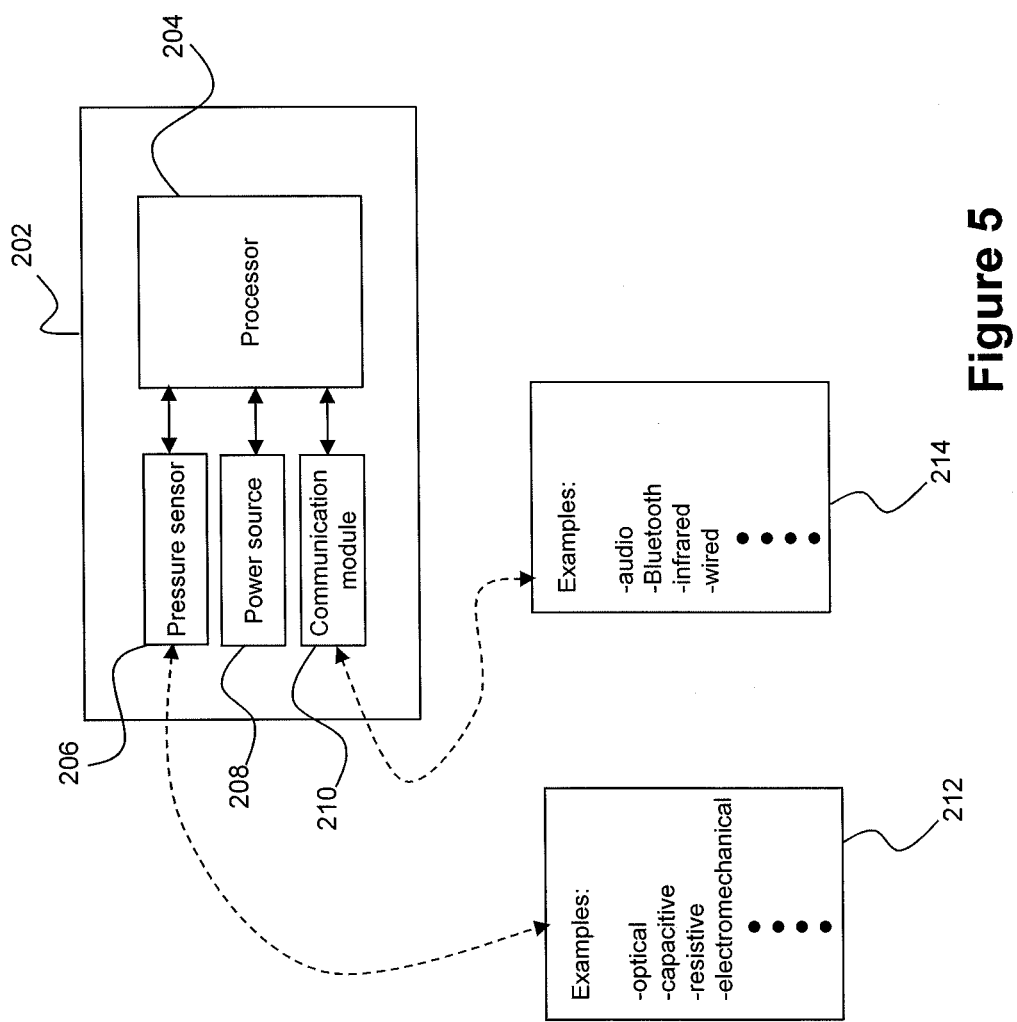
FIG. 5 is a block diagram of an example embodiment of a stylus.

Turning to FIG. 5, an example embodiment of a stylus 202 is provided. The example stylus 202 is powered by a power source 208. It includes a pressure sensor 206, a processor 204, and a communication module 210. The stylus 202 can measure the pressure a user places on the stylus against a touch sensitive display. The pressure, as well as the associated timing, are communicated to the mobile device 100 through the communication module 210.

Examples of pressure sensors 212 include optical sensors, capacitive sensors, resistive sensors, and electromechanical sensors. It can be appreciated that currently known or future known pressure sensors suitable for use in a stylus 202 can be used.

Examples of communication technologies 214 used between the stylus 202 and the mobile device 100 include audio data signals, Bluetooth™ radio, infrared transmissions, wired transmissions, and other wireless transmissions. It can be appreciated that various types of communication technologies can be used to transfer data between the stylus 202 and the mobile device 100.

In some example embodiments, the mobile device 100 has a touch sensitive display 12a, 12b, 12c that can measure position, pressure and time as a writing tool (e.g. finger or stylus 202) moves across the display 12a, 12b, 12c. The touch sensitive display 12a, 12b, 12c, can use capacitive, resistive, electromechanical, or infrared technology to measure the pressure. Other currently known or future known pressure and touch-sensitive displays can be used. In such an example embodiment, the stylus 202 may be a passive stylus 202.

The term "pressure" used herein refers to the force measured when a writing tool presses against the touch sensitive display 12a, 12b, 12c.

It can therefore be appreciated that different approaches to measuring the pressure as a writing tool moves across the display 12a, 12b, 12c.

Figure 6:
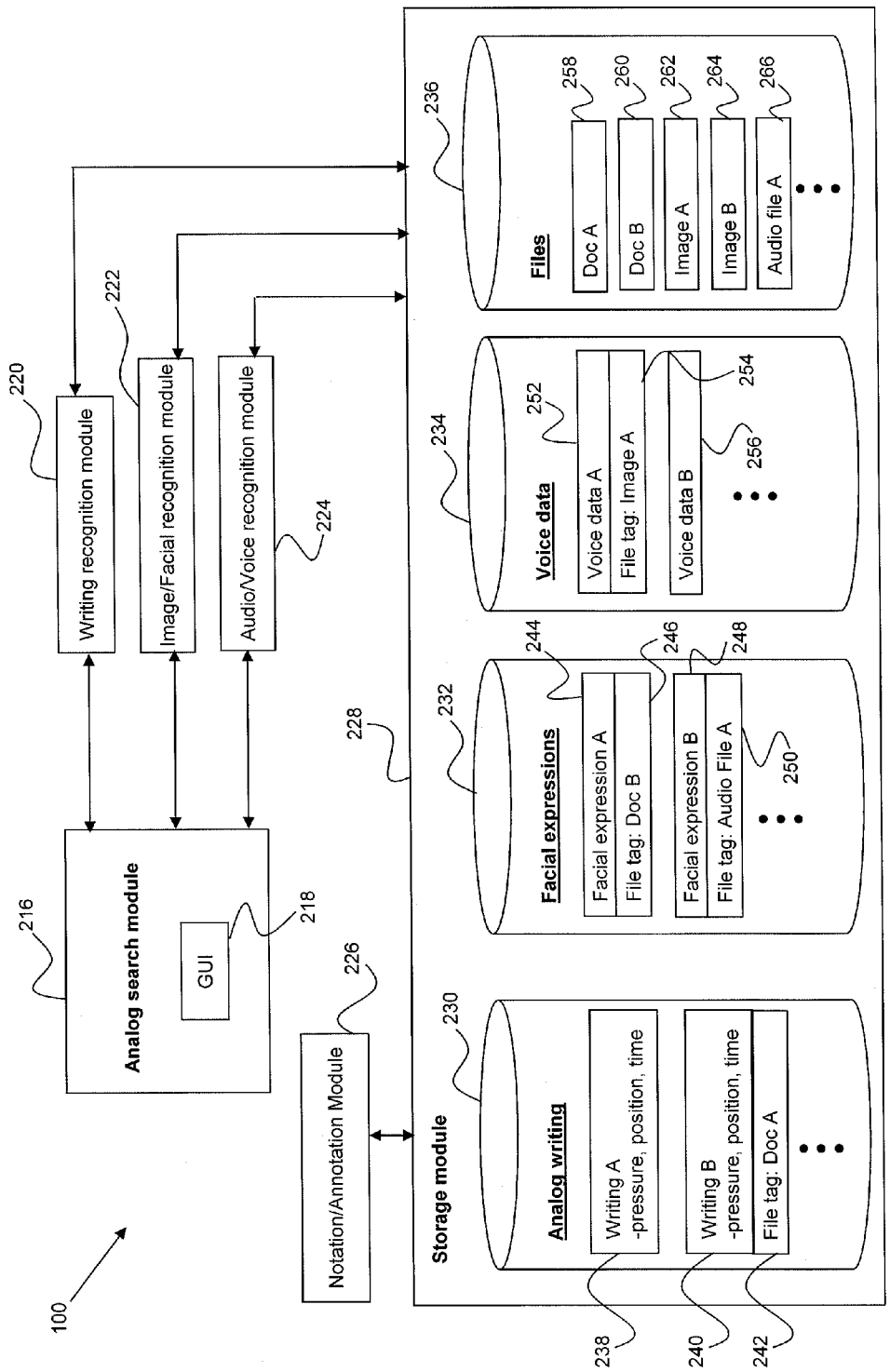
FIG. 6 is a block diagram of an example embodiment of a mobile device showing components for searching for analog notation and annotation.

Turning to FIG. 6, other example embodiment components of the mobile device 100 are provided for performing analog searches. A notation and/or annotation module 226 facilitates the input of analog data.

Analog data herein refers to analog writing, image data, and audio data. Analog writing refers to hand writing and it includes, for example, symbols, diagrams, pictures, letters, doodles, etc. The properties of the analog writing that are measured include position, pressure and the associated time of a writing tool moving across the touch sensitive display 12a, 12b, 12c.

Image data refers to images of facial expressions. The locations, lengths, angles, shapes, size, color, etc. of eyes, eye brows, a mouth, cheeks, wrinkles, teeth, hair, etc. can be measured to determine facial expressions.

Audio data herein refers to voice data. Features of voice data include features in the frequency domain and the time domain. Other more measured features may include volume and frequency.

The notation and/or annotation module 226 allows a user to record and store analog writing, facial expressions, and voice data. The facial expressions can be captured using the camera device 123 on the mobile device 100. The voice data can be captured using the microphone 120 on the mobile device 100.

In an example embodiment, the notation and/or annotation module 226 is used in conjunction with a digital media application (e.g. a document viewer, an image viewer, a video viewer, a song or audio player), such that a user can annotate a digital file.

The analog data, amongst other data, is stored in a storage module 228. It includes an analog writing database 230, a facial expressions database 232, a voice data database 234, and other files 236.

Non-limiting examples of files include documents 258, 260, images 262, 264, and audio files 266. They may also include contact entries for an address book, video files, etc.

The analog writing database 230 includes an entry 238, which stores data of the pressure, position and time of the writing. Another writing entry 240 also stores the associated pressure, position and time. Associated with the second entry 240, is a file tag 242 for document A (258), which indicates that the second entry is associated with document A (258). The file tag 242 can be used to show and record that the analog writing 240 is an annotation of a certain part of document A (258). The file tag 242 may include the file address of the associated file as well as location within the file (e.g. page number, paragraph number, certain time within a song or video, a pixel location within an image, etc.).

The facial expressions database 232 also includes two facial expression entries 244, 28, each associated with a respective file tag 246 and 250. One file tag 246 indicates document B (260), and another file tag 250 indicates audio file A (266). In an example embodiment, a user may provide a happy face of himself or herself and use it annotate a certain time within his or her favourite song. This indicates that the user has a happy emotion with respect to that portion of the tagged song.

The voice data database 234 stores, for example, a first entry 252 associated with a file tag 254 indicating image A (262), and a second entry 256 which does not have an associated file tag.

It can be appreciated that some analog data entries include file tags, such as for annotations, while other analog entries do not include such tags. In other words, analog data entries can be stored simply as analog notations, or stored in the context of digital content as analog annotations.

Continuing with FIG. 6, an analog search module 216 is provided to receive search terms. It includes a GUI 218 for receiving search terms from the user. In an example embodiment, the search terms themselves are analog (e.g. handwriting, an image of a face, voice data, etc.). In another example embodiment, the search terms initially provided by the user are digital (e.g. computer text).

With respect to performing analog writing searches, a writing recognition module 220 is provided. It performs searches by comparing analog search data with the stored analog data in the database 230. The features being compared include the combination of position, pressure and time.

With respect to performing facial expression searches, an image and/or facial recognition module 222 is used to perform image, pattern and/or facial recognition algorithms. Currently known and future known facial recognition algorithms that measure features of a face can be used. The image and/or facial recognition module 222 compares an inputted image of a facial expression, as received using the search module 216, and compares it with images in the database 232.

With respect to performing voice data searches, an audio and/or voice recognition module 224 is provided. A user provides voice data though the analog search module 216, and the voice data is used as a search target. The features of the provided voice data are compared with the stored voice data in the database 234. If the audio and/or voice recognition module 224 finds a match that is similar enough (e.g. the number of data points or features that coincide meet a minimum threshold number), then the stored voice data is presented as the result.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100, or accessible or connectable thereto. Any application or module herein described may be implemented using computer readable/executable instructions or operations that may be stored or otherwise held by such computer readable media.

Figures 7, 8:
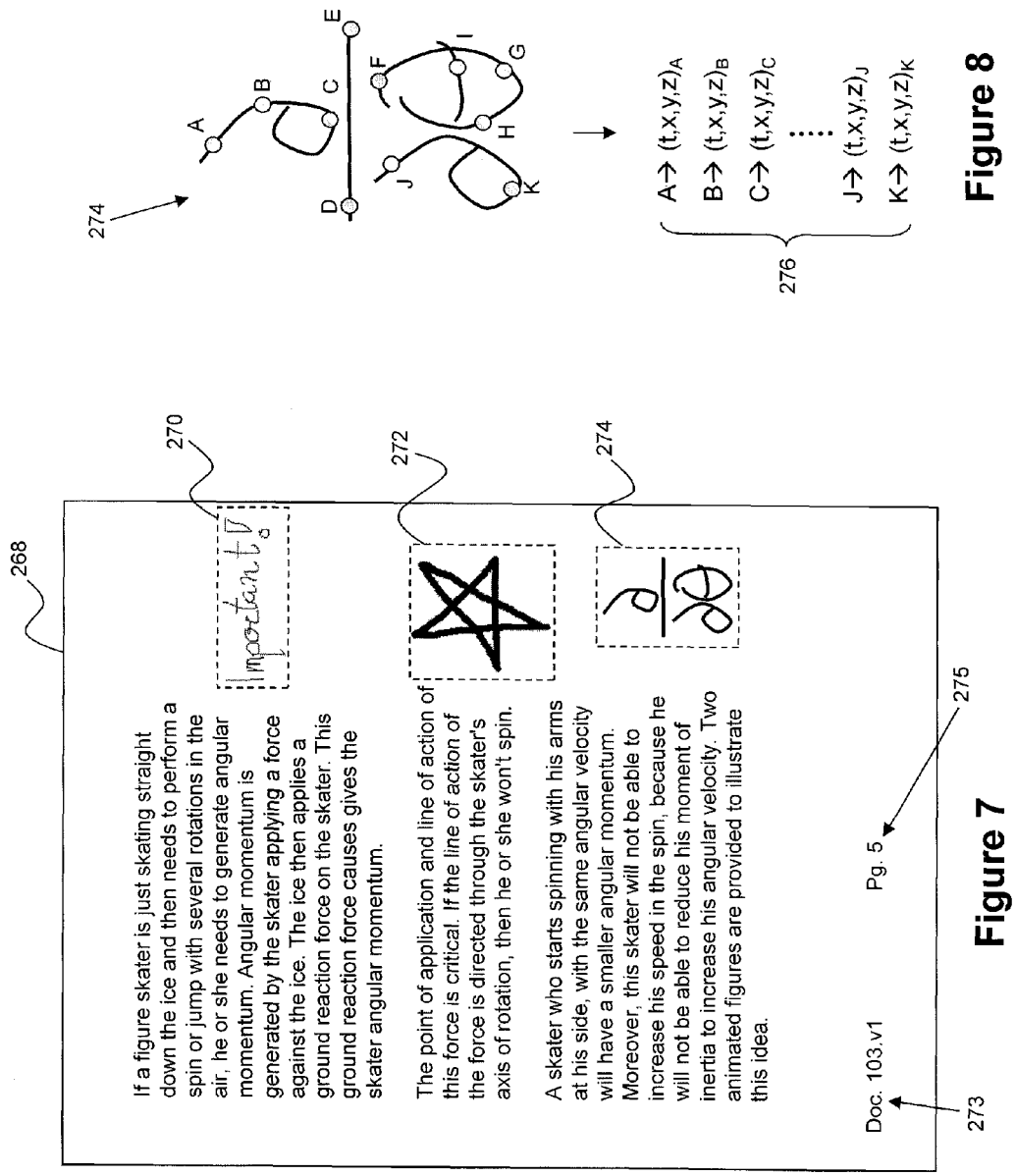
FIG. 7 is a screen shot of an example embodiment of a document that has been annotated using analog writing.
FIG. 8 is an illustration of an example embodiment of analog writing and its corresponding data points of time, position and pressure.

Turning to FIG. 7, a screen shot of an example embodiment of digital media 268 is shown. It is a document of text, which has a document number 273 and a page number 275 that is being currently displayed. A user may use a writing tool (e.g. finger or stylus 202) to annotate the document. For example, the user has written "Important" 270 in the side margins. A star 272 and mathematical notation 274 are also shown in the margins. In an example scenario, these annotations help the user to remember or highlight certain information related to the text in the document.

The analog writing, or hand writing, includes several attributes, such as position and pressure, and how each of these vary with time.

Turning to FIG. 8, an example embodiment of a mathematical notation 274, which has been hand written, is shown. A user moves the writing tool across the touch sensitive display. Data points are collected. For example, data points referenced by the letters A, B, C, . . . , J, K are shown. In another example embodiment, many more data points are collected to provide further detail about the annotation or notation.

Each of the data points includes position, pressure and time. The values 276 associated with each of the data points can be represented using the values "t" for time, "x" and "y" for the coordinates of the position, and "z" for the pressure. For example, point A has the values $(t,x,y,z)_A$ and point B has another set of values $(t,x,y,z)_B$. It can be appreciated that the position and pressure usually varies with time. In this way, position and pressure can be represented as a function of time. The position and pressure data, as functions of time, can be compared with other position and pressure data (also as function of time), when determining if analog data matches each other.

In an example embodiment, the time is tracked by a timer that begins at "0" and is activated when a writing tool interacts with the touch sensitive display 12. The timer is deactivated after detecting that the writing tool has stopped interacting with the touch sensitive display 12 after a pre-determined amount of time. The time may also be deactivated and re-set to "0" if the writing tool lifts off the display screen at a first location and touches the touch sensitive display at a second location, whereby the first location and the second location are a pre-determined distance away from each other.

Figure 9:
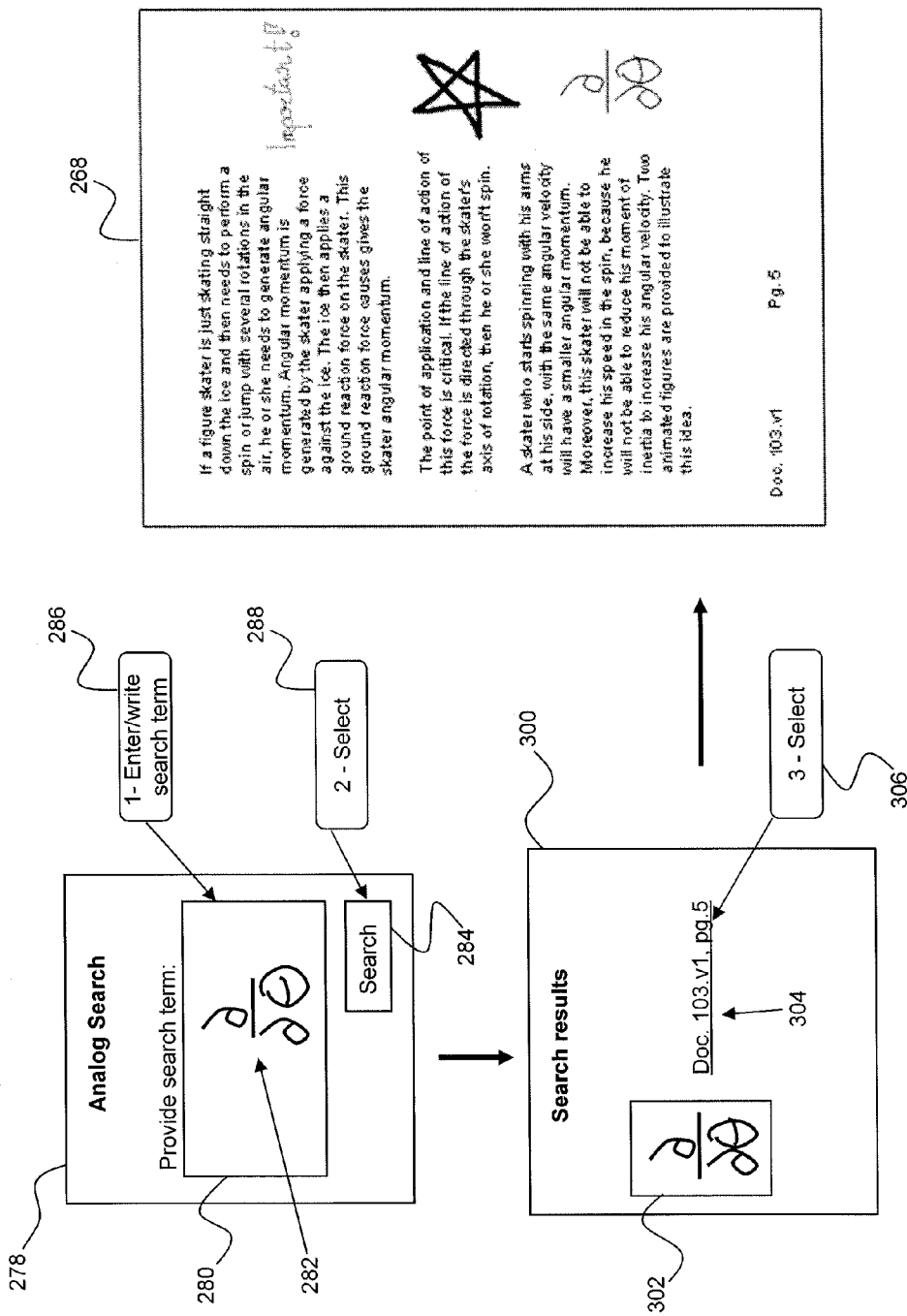
FIG. 9 is an illustration of example embodiment screen shots, including a graphical user interface (GUI) for entering an analog search term, a GUI for displaying the results, and a screen shot of an associated file.

Turning to FIG. 9, an example embodiment of various screen shots are provided. An analog search GUI 278 is provided and it includes a box 280 for receiving an analog search term. For example, a user enters or writes a search term 282, in this example, of mathematical notation. When the user is writing the search term 282, the data points of time, pressure, and position are being recorded. After detecting that the search button 284 has been selected 288, a search is performed.

The relative positioning of the written strokes, the timing of the written strokes, and the pressure along the data points are compared between the search term 282 and stored analog writing in the database 230. In the example embodiment, the stored entry of the analog writing 274 is shown to be match.

A "match" refers to two sets of analog data that are considered to be similar or the same. It can be appreciated that analog data, such has handwriting, facial expressions, and voice data, typically varies. A user, for example, can write the letter "A" many times, and each time the letter "A" may be different.

An example embodiment of determining a "match" includes the user of probability models. A search term analog data set and a first analog data set are inserted into a probabilistic model, which outputs a probability value related to the search term analog data set matching the first analog data set. The search term analog data set is then compared with a second analog data set using the same probability model, to generate another probability value. This can comparison with the search term analog data can be repeated for any number of analog data sets. The analog data set that produces the highest probability value is established as a match to the search term analog data set.

In another example embodiment, any analog data set that produced a probability value above a certain threshold when compared with the search term analog data set, is considered match.

It can be appreciated that a probability value ranges between 0 and 1. It can also be appreciated that various probability values can be compared when comparing two analog data sets. For example, for each data set comparison, there is a probability value specific to comparing position as a function of time, and there is a probability value specific to comparing pressure as a function of time.

It can also be appreciated that various currently known and future known probabilistic models can be used with the systems and methods described herein.

In another example embodiment, a match can be determined by determining the number of similar features between two analog data sets. For example, two analog data sets are considered a match if the number of similar features is at least equal to or above a minimum threshold. In other words, two sets of analog data do not need to be exact in order for the two sets to be considered a match. The minimum threshold can be determined based on computing a fraction of the available data points. In another example embodiment, the minimum threshold is predetermined.

It can be appreciated that various methods for determining if two analog data sets match can be used.

The GUI 300 shows an image 302 of the stored analog writing 274, which is the result from the search. In this example embodiment, the stored analog writing 274 is associated with digital media 268, in this case a document. A link 304 to the document, and the section or page within the document, is also provided. When a selection input 306 is received for the link 304, the device 100 then displays the document 268.

Turning to FIG. 10, an example embodiment of computer executable or processor implemented instructions are provided for receiving and storing analog writing. At block 308, the mobile device 100 receives a first analog writing. At block 310, the device 100 records the time, pressure, and position as a writing tool (e.g. finger or stylus 202) moves across the touch-sensitive screen. At block 312, the first analog writing is stored in a database. In an example embodiment, it is stored in association with a file, as well as a particular location within the file. For example, a file tag can be used to reference the association.

Turning to FIG. 11, an example embodiment of computer executable or processor implemented instructions are provided for performing an analog search for writing. At block 314, the device 100 displays an analog search GUI. At block 316, it receives a second analog writing, and records the associated timing, pressure and position as a writing tool moves across the touch sensitive screen. The second analog writing is the search term. At block 318, the device 100 searches the database to determine if there is a stored writing that matches the time, pressure and position of the second analog writing. For example, if the time, pressure, and position values of the second analog writing match the values of the first analog writing (block 320), then the first analog writing is considered a match, or a positive result. It first analog writing is displayed (block 322) and the associated file is also displayed (block 324). In another example embodiment, a link to the associated file is provided. It can be appreciated that, in some example embodiments, there is no associated file.

If there is no match, then the device displays an indication that no results are found (block 326).

Turning to FIG. 12, an example embodiment of computer executable and processor implemented instructions are provided for storing and searching for facial expressions. The device 100 receives a first image of a face (block 328). The first image can be captured by a camera 123. The first image then stored in a database (block 330). In an example embodiment, it is stored in association with a file, or in association with a particular location in the file. The association, for example, is marked by a file tag.

As shown by the dotted line between block 330 and 332, some time may elapse. A user may wish to initiate a search using facial expressions. At block 332, the device 100 displays an analog search GUI. It receives a second image of a face (block 334), which is the analog search term. The database is searched to determine if the second image matches a stored image (block 336). For example, if the features of the second image match the features of the first image (block 338), then the first image is displayed as a positive search result. If there is a file associated with the first image, it is displayed, or a link to the file is displayed (block 342). If there is no match, an indication that no results are found is displayed (block 344).

Similar to the operations in FIG. 12, turning to FIG. 13, an example embodiment of computer executable and processor implemented instructions are provided for storing and searching for voice data. Voice data is received (block 346) and is stored in a database (block 348). In an example embodiment, it is stored in association with a file.

As shown by the dotted line between block 348 and 350, some time may elapse. At block 350, an analog search GUI is displayed and it is used facilitate the receipt of a second voice data (block 352). At block 354, the database is searched to determine if the second voice data matches another voice data. For example, if the features for the second voice data and the first voice data match (block 356), at block 358, then the first voice data is played over the device's audio speaker, or a link to play the voice data is displayed. At block 360, the associated file, if any, or a link thereto, is displayed. If there is no match, an indication that no results are found is displayed (block 362).

Figure 14:
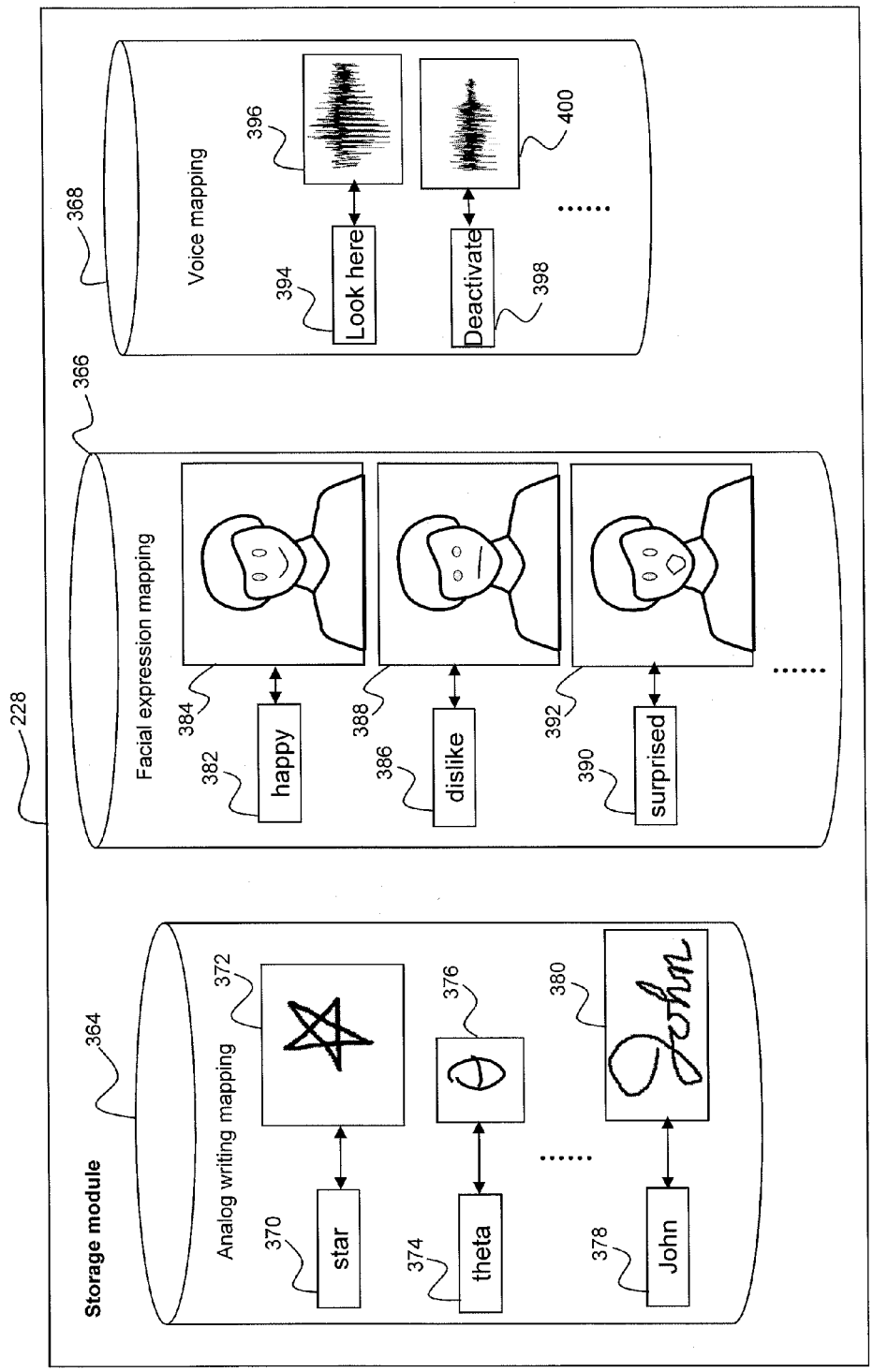
FIG. 14 is a block diagram of an example embodiment of other components in the storage module, shown in FIG. 6, including databases storing digital and analog data mappings.

Turning to FIG. 14, in an example embodiment, the storage module 228 further includes a mapping database which maps digital content to analog content. For example, mappings for analog writing are stored in a database 364, which includes digital search terms stored in association with analog writing. The digital computer text "star" 370 is stored in association with the analog writing 372 showing a picture of a star. The digital computer text "theta" 374 is stored in association with the analog writing 376 of the mathematical symbol. The digital computer text "John" 378 is stored in association with the analog writing 380 of the cursively written name John.

A similar mapping database 366 is provided for facial expressions. The digital text "happy" 382 is mapped to an image of a facial expression 384 showing a smiling face. The digital text "dislike" 386 is mapped to an image of a facial expression 388 showing an unhappy face. The digital text "surprised" 390 is mapped to an image of a facial expression 392 showing a surprised face.

The mapping database 368 maps digital text to voice data. The digital text "look here" 394 is mapped to voice data 396. The digital text "deactivate" 394 is mapped to voice data 400.

The mapping databases 364, 366 and 368 can be used to provide a search, which is initially based on a digital search term. For example, the device 100 receives a digital search term including digital text. It then uses the digital text to obtain analog data. The analog data can be obtained by searching the mapping database using the digital text. If the digital text is found, the corresponding analog data, as per the mapping, becomes the analog search term. The device 100 searches another database to determine if stored analog data matches the analog search term. If so, at least one of the stored analog data or a link thereto is displayed. In this way, an analog search can be performed by using digital text. This can be useful if a user does not have time generate an analog search term, or the device 100 itself does not have capabilities to capture or receive analog data (e.g. does not have a camera, does not have a touch sensitive display, or does not have a microphone). The user can enter in a digital search term and obtain a corresponding analog search term, which is used in performing the analog search.

Turning to FIG. 15, an analog search GUI for writing 402 is presented. A user can enter in digital text into the field 404. The text can be "star". After selecting the "search" button 406, the mapping database 364 is searched. The digital text entry 370 is found, and the corresponding analog writing 372 is established as the analog search term. It is then used to perform an analog search in the database 230. The resulting analog writing stored in the database 230 is shown in a results GUI 408, which displays the stored writing 372 and the associated file 410.

Turning to FIG. 16, a search GUI 412 includes a field 414 for receiving a digital search term (e.g. "happy"). When a user selects the "search" button, a digital search is first performed in the mapping database 366 using the digital search term. If found in the database 366, the corresponding facial expression (e.g. image 384) is used as the analog search term. The facial expression is then used as an analog search term and it is compared with other facial expressions stored in the database 232. If the facial expression stored in the database 232 is found, then it is shown in the search results GUI 407 as an image 388. The associated file 416, if any, is also shown.

Turning to FIG. 17, a search GUI 418 is configured to receive a digital search term (e.g. "call Mike") in the field 420. After detecting the "search" button 406 has been selected, a digital search may be performed using the mapping database 368.

However, in an example embodiment, the digital search term is used to generate analog data. The digital text "call Mike" is converted to speech using text-to-speech algorithms. Currently known and future known text-to-speech algorithms and processes can be used. In this way, analog speech data is generated from the digital text. The speech or voice data is then used to perform a voice recognition comparison with entries in the database 234. If the voice data stored in the database 234 is found to match the generated voice data, then the stored voice data 422 is presented in the results GUI 421. Any associated files 424 are also presented. In the example embodiment, a link the associated file is provided.

Figure 18:
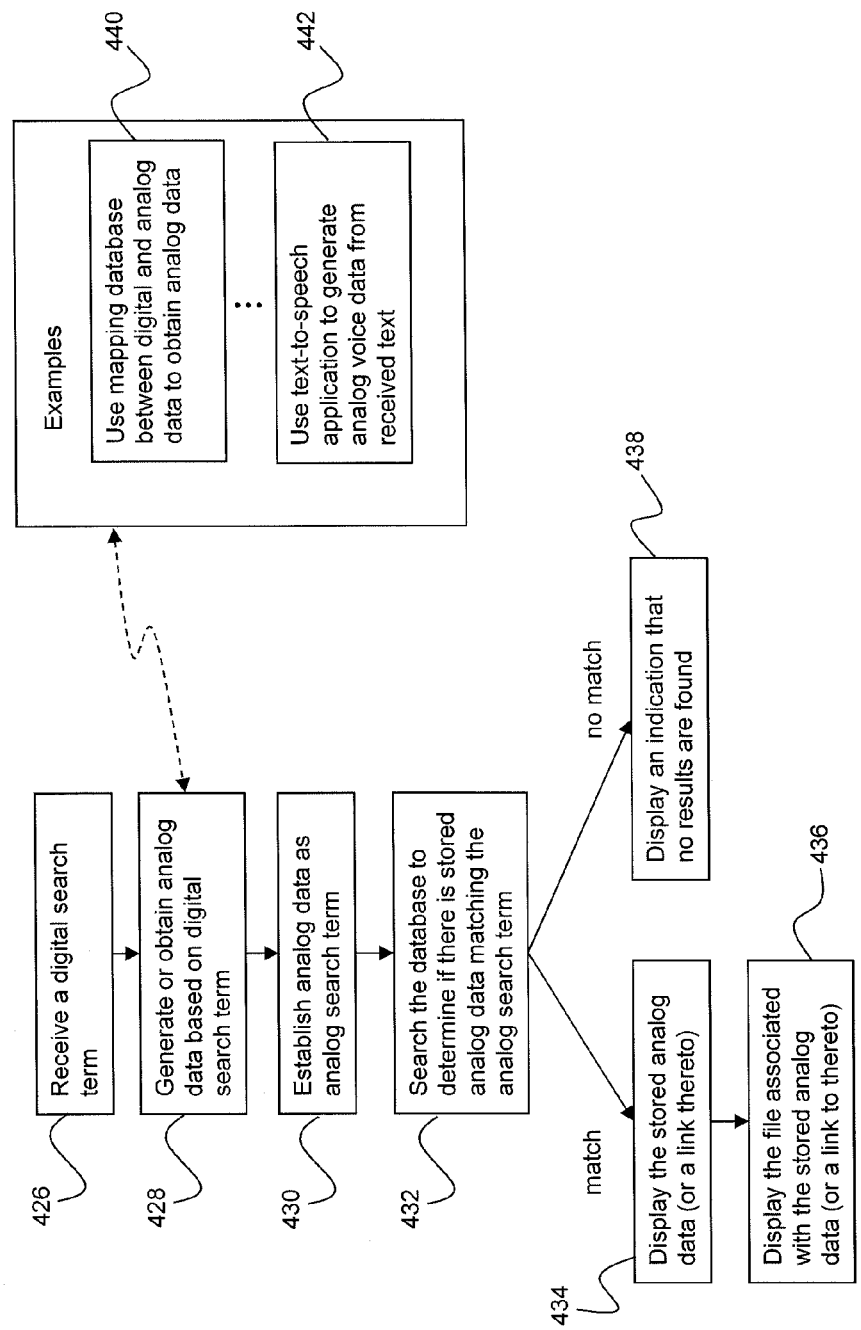
FIG. 18 is a flow diagram of an example embodiment of computer executable or processor implemented instructions for using a digital search term to generate or obtain an analog search term, and using the analog search term to perform an analog search.

Turning to FIG. 18, an example embodiment of computer executable or processor implemented instructions is provided for performing analog searches using a digital search term. At block 426, the device 100 receives a digital search term (e.g. digital text). The device generates or obtains analog data based on the digital search term (block 428). For example, a mapping database between digital and analog data is used to obtain analog data (block 440). In another example embodiment, a text-to-speech application is used to generate analog voice data from the received text (block 430).

The analog data is established as the analog search term (block 430). At block 432, the device 100 searches the database (e.g. databases 230, 232, 234) to determine if there is stored analog data matching the analog search term. If so, the stored analog data, or a link thereto, is displayed as a search result (block 343). At block 436, the associated file, or a link thereto, is displayed. Otherwise, if there is no match, an indication that no results are found is displayed (block 438).

In an example embodiment, a method performed by a computing device is provided for searching for analog writing. It includes: storing a first analog writing including a first set of position, pressure and time data; receiving a search term including a second analog writing, the second analog writing including a second set of position, pressure and time data; determining if the second set of position, pressure and time data matches the first set of position, pressure and time data; and, if so, displaying the first analog writing as a search result.

In an example embodiment, at least one of the first set and the second set of position, pressure and time data is recorded as a writing tool (e.g. finger or stylus 202) moves on a touch screen device. In another example embodiment, the writing tool is a stylus. In another example embodiment, the first analog writing is stored in a database including multiple analog writing entries, and the method further comprises searching the database and comparing the second analog writing with each one of the multiple analog writing entries in the database. In another example embodiment, the first analog writing is stored in association with a file. In another example embodiment, the first analog writing is an annotation of the file. In another example embodiment, the method further includes displaying the search result and the file. In another example embodiment, the first analog writing is stored in association with a location within the file, and the search result and the location within the file are displayed. In another example embodiment, the search result and a link to the file are displayed. In another example embodiment, the first set and the second set of position, pressure, and time data each comprise multiple data points, each one of the multiple data points having a format (t,x,y,z), wherein t represents time, x and y represent position coordinates, and z represents pressure. In another example embodiment, the second set of position, pressure and time data matches the first set of position, pressure and time data if at least a predetermined number data points are equal. In another example embodiment, the method further includes computing a probability value using the first set and the second set of position, pressure and time data, and if the probability value is equal to or above a threshold value, determining the first set and the second set of position, pressure and time data match. In another example embodiment, the method further includes: computing a probability value using the first set and the second set of position, pressure and time data; computing at least one other probability value using the second set of position, pressure and time data and at least one other set of position, pressure and time data corresponding to at least one other analog writing; and if the probability value is highest, determining that the second set of position, pressure and time data matches the first set of position, pressure and time data.

In another example embodiment, a method performed by a computing device is provided for searching for facial expression. It includes: storing a first image of a facial expression in association with a file; receiving a search term including a second image of a facial expression; determining if the second image matches the first image; and if so, displaying the first image as a search result and at least one of the file and a link to the file.

In an example embodiment, the first image is embedded within a location in the file, and after determining the second image matches the first image, the location in the file is displayed.

In another example embodiment, a method performed by a computing device is provided for searching for analog data. It includes: receiving a digital search term including digital text; obtaining analog data using the digital text and establishing the analog data as an analog search term; searching a database to determine if stored analog data matches the analog search term; and if so, at least one of displaying the stored analog data or a link thereto.

In an example embodiment, the analog data is obtained by searching a mapping database including at least a stored digital text that is stored in association with the analog data. In another example embodiment, the method further includes comparing the digital text of the digital search term with the stored digital text, and if they match, using the analog data in the mapping database as the analog search term. In another example embodiment, the analog data is obtained by generating the analog data from the digital text. In another example embodiment, the analog data is voice data, and the method further comprises applying a text-to-speech operation to the digital text to generate the voice data, and establishing the voice data as the analog search term. In another example embodiment, the analog data is analog writing. In another example embodiment, the analog data is an image of a facial expression.

The steps or operations in the flow charts described herein are just for example. There may be many variations to these steps or operations without departing from the spirit of the invention or inventions. For instance, the steps may be performed in a differing order, or steps may be added, deleted, or modified.

It will be appreciated that the particular example embodiments shown in the figures and described above are for illustrative purposes only and many other variations can be used according to the example embodiments described. Although the above has been described with reference to certain specific example embodiments, various modifications thereof will be apparent to those skilled in the art as outlined in the appended claims.

The invention claimed is:

1. A method performed by a computing device for searching for analog data, comprising:
receiving a digital search term;
using the digital search term to search an analog writing mapping database, a facial expressions mapping database and a voice mapping database, the mapping databases respectively comprising mappings between digital text and analog writing, mappings between digital text and photos of facial expressions, and mappings between digital text and voice data;
when the digital search term matches a digital text entry in one of the mapping databases, obtaining an analog search term mapped to the digital text entry, the analog search term comprising an analog writing, a photograph of a facial expression or a voice data;
consistent with which one of the mapping databases that was used to obtain the analog term, searching one of an analog writing database, a facial expression database and a voice database using the analog search term to return the analog data and a data link to a location of the analog data within a file as a search result.

2. The method of claim 1 wherein the analog data comprises a first time series of position data and a first time series of pressure data, and the analog search term comprises a second time series of position data and a second time series of pressure data.

3. The method of claim 1 wherein the analog data comprises a facial expression comprising measurements of location, color, shape and size of eyes, eye brows, mouth, and hair.

4. The method of claim 1 wherein the file is a song file or a video file, and the location of the analog data is a certain time within the song file or the video file.

5. The method of claim 1 wherein the file is an image file and the location of the analog data is a pixel location within the image file.

6. The method of claim 1 wherein the file is a document and the location of the analog data is a page number or a paragraph number within the document.

7. The method of claim 1 wherein the mappings between digital text and analog writing comprises a mapping between a word and an analog writing of a symbol, wherein the word is a name of the symbol.

8. The method of claim 1 wherein the analog writing database comprises analog writing entries, the facial expression database comprises facial expression entries, and the voice database comprises voice data entries, each of the entries in the databases is stored in association with a file tag identifying a given location of a given analog data within a given file.

9. The method of claim 1 wherein the analog data and the analog writing comprise multiple data points having a format (t,x,y,z), wherein t represents time, x and y represent position coordinates, and z represents pressure.

10. A computing system for searching for analog data, comprising:
a memory configured to store at least processor executable instructions and an analog writing mapping database, a facial expressions mapping database and a voice mapping database, the mapping databases respectively comprising mappings between digital text and analog writing, mappings between digital text and photos of facial expressions, and mappings between digital text and voice data, and the memory further configured to store an analog writing database, a facial expression database and a voice database;
a processor in communication with the memory and configured to at least:
receive a digital search term;
use the digital search term to search the mapping databases;
when the digital search term matches a digital text entry in one of the mapping databases, obtain an analog search term mapped to the digital text entry, the analog search term comprising an analog writing, a photograph of a facial expression or a voice data;
consistent with which one of the mapping databases that was used to obtain the analog term, searching one of the analog writing database, the facial expression database and the voice database using the analog search term to return the analog data and a data link to a location of the analog data within a file as a search result.

11. The computing system of claim 10 wherein the analog data comprises a first time series of position data and a first time series of pressure data, and the analog search term comprises a second time series of position data and a second time series of pressure data.

12. The computing system of claim 10 wherein the analog data comprises a facial expression comprising measurements of location, color, shape and size of eyes, eye brows, mouth, and hair.

13. The computing system of claim 10 wherein the file is a song file or a video file, and the location of the analog data is a certain time within the song file or the video file.

14. The computing system of claim 10 wherein the file is an image file and the location of the analog data is a pixel location within the image file.

15. The computing system of claim 10 wherein the file is a document and the location of the analog data is a page number or a paragraph number within the document.

16. The computing system of claim 10 wherein the mappings between digital text and analog writing comprises a mapping between a word and an analog writing of a symbol, wherein the word is a name of the symbol.

17. The computing system of claim 10 wherein the analog writing database comprises analog writing entries, the facial expression database comprises facial expression entries, and the voice database comprises voice data entries, each of the entries in the databases is stored in association with a file tag identifying a given location of a given analog data within a given file.

18. The computing system of claim 10 wherein the analog data and the analog writing comprise multiple data points having a format (t,x,y,z), wherein t represents time, x and y represent position coordinates, and z represents pressure.

* * * * *